June 19, 1923.
P. DE PFYFFER
1,459,089
RESILIENT WHEEL
Filed June 25, 1920
3 Sheets-Sheet 3
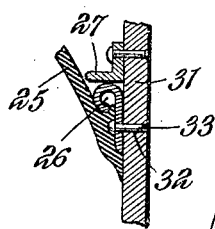
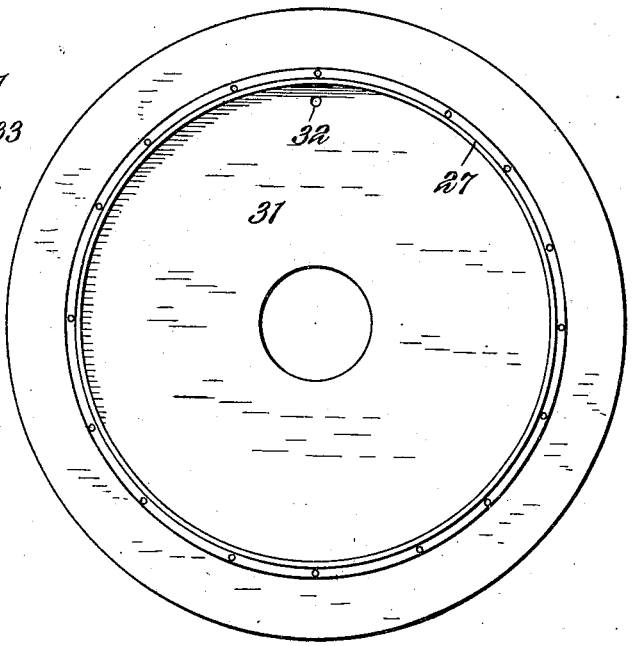
Paul de Pfyffer
INVENTOR Patented June 19, 1923.

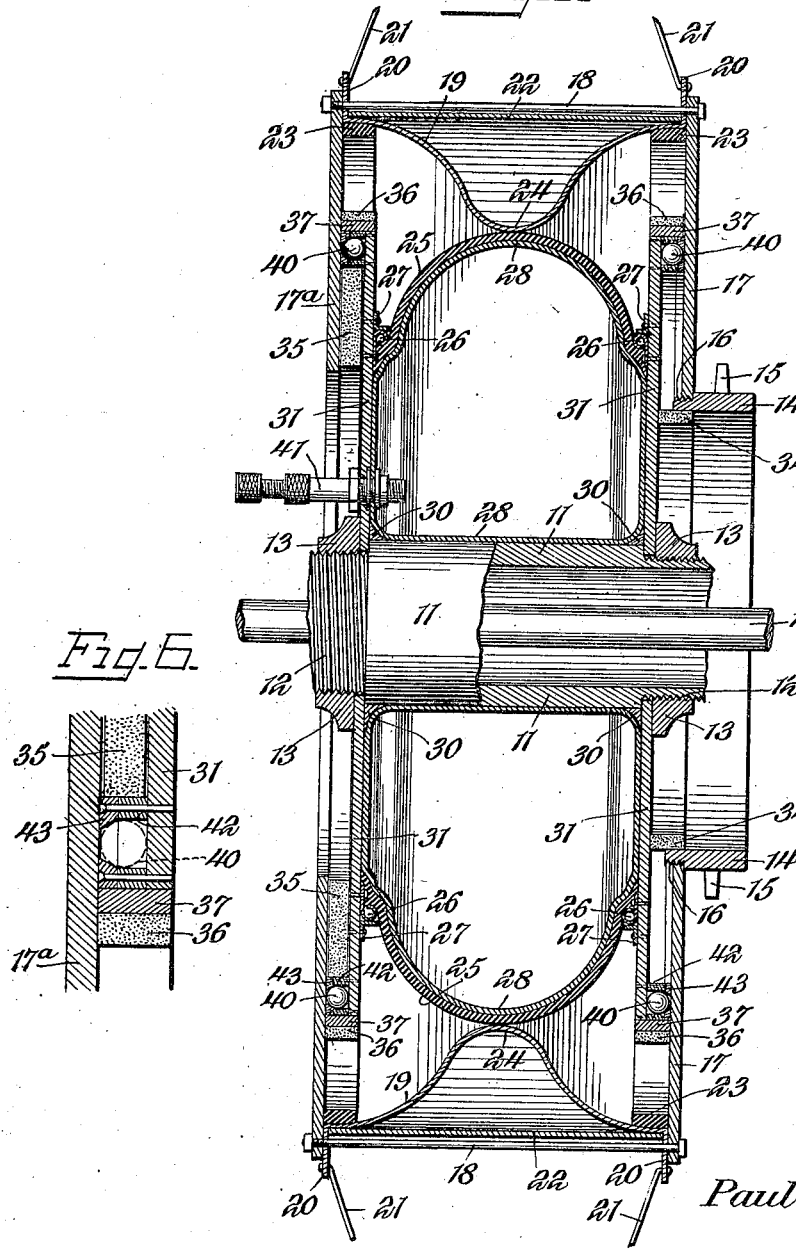

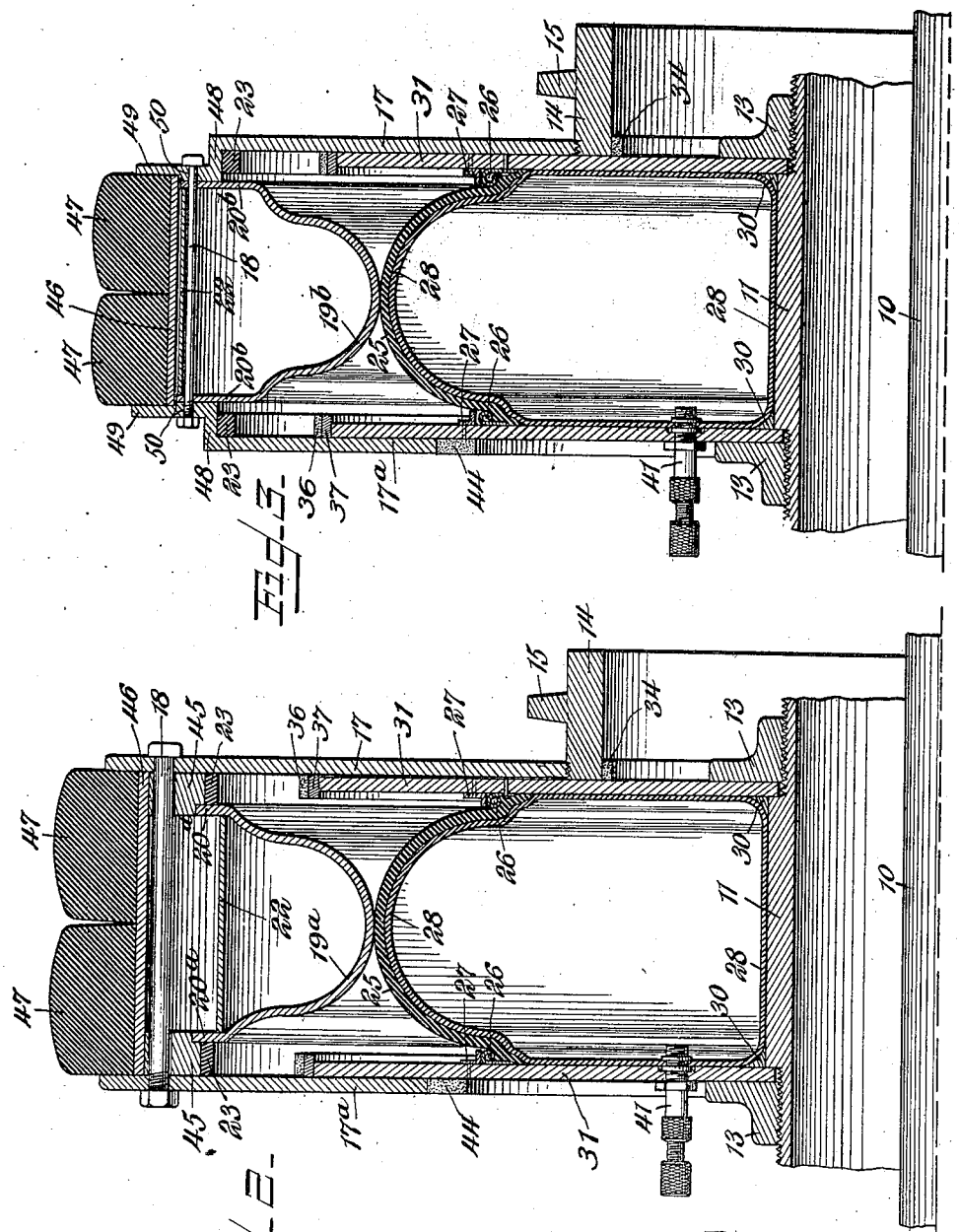

1,459,089

UNITED STATES PATENT OFFICE.

PAUL DE PFYFFER, OF KELOWNA, BRITISH COLUMBIA, CANADA.

RESILIENT WHEEL.

Application filed June 25, 1920. Serial No. 391,688.

*To all whom it may concern:*

Be it known that I, PAUL DE PFYFFER, a subject of the King of Great Britain, residing at Kelowna, in the Province of British Columbia and Dominion of Canada, have invented a new and useful Resilient Wheel, of which the following is a specification.

This invention relates to vehicle wheels of the resilient type.

An object of the invention is to improve upon the construction of the vehicle wheel hub patented by me December 26, 1916, No. 1,210,151.

An additional object is to provide a novel resilient wheel wherein the spokes are replaced by a compressed air or similar resilient cushion.

Many attempts have heretofore been made to obtain a puncture-proof resilient wheel by locating a pneumatic tire or a rubber cushion between the rim and the axle of the wheel instead of between the rim and the road. These have all proved to give an unsatisfactory cushioning effect due to the undesirable reduction in the size of the air volume in the cushion and at the same time the large increase in the bearing surface of the encircling casing upon the inner cushion. While the ordinary pneumatic tire mounted on a rim has only a small part of its circumference in contact with the road, the encircling rigid casing of an internally located annular cushioning member necessarily bears against one-half of the circumference of the internal tire. It is an object of the invention to give a satisfactory cushioning effect while employing an internal air cushion by reducing the bearing surface, the reduction being effected in a direction parallel to the wheel axle.

In short, it is the special object of the invention to obtain from a cushioning member, which is located somewhere between the rim and the axle of a wheel, the same ratio between the virtual bearing surface and the air volume of the cushioning member, as is obtained with a rim-mounted pneumatic tire in direct contact with the road. When this same ratio exists, the resilient wheel will produce a cushioning effect equal to that yielded by a rim-mounted pneumatic tire.

The invention will be best understood from a consideration of the following detailed description taken in connection with the accompanying drawings forming part of this specification, with the understanding however, that the invention is not confined to any strict conformity with the showing in the drawings, but may be changed and modified so long as such changes and modifications mark no material departure from the salient features of the invention as expressed in the appended claims.

In the drawings:—

Fig. 1 is a diametric section through the improved vehicle wheel hub forming a part of the present invention.

Figs. 2 and 3 are radial cross sections of modifications of the invention wherein the spokes of the wheel are replaced by a pneumatic cushion.

Fig. 4 is an elevation showing the inner face of one of the disks employed in the construction of Figs. 1, 2 and 3.

Fig. 5 is a detail cross section on an enlarged scale of the means for holding the clincher ring in place.

Fig. 6 is a detail on an enlarged scale showing the housing for the ball bearings between the inner and outer disks which form the main casing of the wheel hub of Fig. 1.

In the embodiment of the invention disclosed in Fig 1, an improved wheel hub having an annular pneumatic cushion fitted into it is disclosed. A casing is provided for this cushion and to the periphery of the casing spokes are secured, which spokes are of considerably less length than the usual spokes of wheels and which, being secured at their other ends to the felly of the wheel in the usual manner, are not illustrated in full. In the embodiments illustrated in Figs. 2 and 3, the wheel hub of Fig. 1 is modified and enlarged so as to be directly connected to the rim, thus eliminating spokes altogether.

Throughout the several figures of the drawings, similar parts have similar reference numerals though varying slightly in the different modifications in proportions and size.

The numeral 10 denotes a spindle about which a sleeve 11 revolves, there being suitable anti-friction bearing members interposed between the spindle and sleeve in the manner disclosed in my prior patent, or in any other desirable way. The sleeve 11 has each end reduced and screw threaded as indicated at 12, and nuts 13 are mounted upon the screw threaded sections 12 to hold parts to be described upon the sleeve. A driving member 14 has sprocket teeth 15 to engage with a sprocket chain (not shown), whereby the wheel may be power driven. One edge of the wheel 14 has screw threads 16 whereby it is detachably secured to an annular disk 17. The annular disk 17 is flat on both faces, as shown, and has a width to extend between the periphery of the sprocket wheel 14 and the outside of the wheel hub. A disk 17$^a$ is provided on the other side of the hub, the two disks being alike except that disk 17$^a$ has no screw threads. The disks 17, 17$^a$ are joined by transversely running bolts 18 provided at spaced intervals near the peripheries of the disks and passing through suitable alined perforations in the respective disks.

Mounted between the disks 17 and 17$^a$ is an annular steel casing 19 having outstanding flanges 20. Each disk is abutted against the corresponding flange 20 with the bolts 18 passing through perforations in the flanges. The spokes 21 of the wheel are secured to the flanges 20 and to the felly or rim of the wheel in the usual manner. A ring 22 having a width equal to the width of casing between the flanges 20 is seated upon said casing and received between said flanges, being held in that position by the bolts 18 which are arranged outside the ring. The ring 22 prevents the flanges 20 from tending to approach each other when the disks 17 and 17$^a$ are strongly pressed against the flanges 20 by means of bolts 18. This ring is split transversely to allow of its ready mounting and demounting. The bolts 18 and the outer disks 17, 17$^a$ prevent any tendency on the part of the flanged ends of the casing 19 to separate.

Annular cushions 23 of tough rubber or the like are fitted inside of the disks 17, 17$^a$ bearing against the under face of the steel casing 19. The purpose of the annular cushions 23 will be made clear later. The annular casing 19 is concaved intermediate the flanges 20, having an inwardly-projecting relatively narrow section 24. There is a pneumatic cushioning member provided upon the hub comprising a relatively heavy unstretchable mantle 25 of material similar to that used for the casings of pneumatic tires and a flexible inner tube 28 similar to the inner tube of a pneumatic tire. The mantle 25 is so mounted as to present an outwardly convex face as is common in the outer treads of tires. The convexity of the mantle 25 is opposed by the convexity of the inwardly-directed part 24 of the steel casing 19. The air cushion with its mantle 25, when in normal or inflated condition, bears against the section 24 of the steel casing, as shown in the drawings, or in other words the convex side of the section 24 touches the convex face of the pneumatic cushion, the convexities of the two parts opposing each other. The radius of curvature of section 24 is considerably less than that of the mantle 25, being in the illustrated embodiment, only about half of the radius of the latter.

The mantle 25 is held in position by a clinching ring 26 shown on an enlarged scale in Fig. 5. The ring 26 is held in position against revolving movement by a pin 33 passing through a hole 32 provided in an inner disk 31. The pin 33 may be permanently secured to the ring 26 and is held in hole 32 by the pressure of the pneumatic cushion. There are two of these inner disks 31, one being on each side of the hub but both being interiorly arranged with respect to the outer disks 17, 17$^a$. The disks 31 fit over sleeve 11 and are there held by the nuts 13. An annular angle member 27 is secured to each disk 31 to hold the detachable clinching ring 26 in position against radial movement with respect to the wheel.

A pair of wooden rings 30 fit over the sleeve 11 and against the inner disks 31. These wooden rings have inner concaved faces so as to support the flexible inner tube 28 at the corners formed between the inner disks and sleeve and prevent any tendency on the part of the inner tubes to crack or weaken at such corners. One of the disks 31 has a passageway to admit a valve stem 41 secured to the inner tube 28 and providing means by which compressed air may be admitted within the cushioning member. This stem may be secured to the inner disk 31 also by a nut or the like.

The inner and outer disks 31 and 17, 17$^a$ are spaced apart in the embodiment shown in Fig. 1, and anti-friction means is interposed between these two disks. Such means comprise ball bearings 40 mounted in circular guideways, which guideways include the inner and outer disks and rings 42 and 43. This construction is most clearly seen from Fig. 6. The rings 42 are provided with grooves or openings at spaced intervals which receive the balls. The rings 43 also have matching openings for the ball bearings, which openings are tapered so as to prevent the balls from falling out once they are in place. The rings 42 and 43 are secured to the inner disks 31 in any desirable way. In order to prevent the dust from the road working its way into the ball bearings, felt washers 34 in the form of a ring are provided on the inside of the wheel fitting against the inner side of the driving member 14 and against the adjacent inner disk 31. This ring is held in place by friction or in any suitable manner. On the other side a felt washer 35 in the form of a flat ring is provided, in this case fitting between the inner disk 31 and outer disk 17$^a$. Obviously, a washer similar to element 35 may be provided on the inner side of the wheel, as well, if it were deemed necessary, there being a space between the inner disk 31 and outer disk 17 well adapted to receive such a washer.

While the pneumatic cushioning member of the present invention is not subjected to any wear but instead is protected from all influences which would tend to shorten its life, yet under certain circumstances it may be that the pneumatic member may become deflated, in which case the steel casing 19 would be moved by the weight of the vehicle toward the axle. For such emergencies there is provided an annular cushion 23 of tough rubber placed on the inner face of the casing 19 inside the outer disks 17, 17ª. Steel rings 37 are mounted upon the peripheries of the inner disks 31 and bear against the outer disks besides holding the rings 42, 43 in position. The steel rings 37 are in turn surmounted by felt washers 36 to prevent lubricant from the ball bearings passing into the interior of the hub. In case the pneumatic cushion becomes deflated, the heavy rubber rings 23 will rest upon the supports afforded by the rings 37, thus preventing any damage to parts of the wheel.

From the foregoing, it is seen that the improved wheel hub construction here described consists of two normally concentric main parts, one of which is revolubly secured to the axle while the other is rigidly secured to the rim of the wheel and to the driving member; that is to say the sprocket. When the driving member receives a power impulse, the outer casing represented by the outer disks 17, 17ª and the steel concaved member 19, will be revolved. The inner casing will be carried along with it so that there is no relative movement between the pneumatic cushion with the adjacent parts and the outer or enclosing parts. The two parts of the wheel turning as one, it will be seen that the ball bearings interposed between the parts are ordinarily not subjected to any rotation, with the result of very little wear of the parts. When the wheel strikes an obstruction in the road, the shock will be transmitted through the spokes to the casing 19, which bears upon the resilient air cushion mounted on the sleeve. This impulse will be swallowed up by inward movement of the casing 19 against the cushion. Because of the shape of the concaved section 24 of the casing 19, there is but a small load-bearing surface between the pneumatic cushion and the steel casing. The result is that a cushioning effect is obtained similar to the effect common to the usual rim-mounted pneumatic tire in direct contact with the road. The same ratio exists between the effective bearing surface and the air volume of the cushioning member as is common to the usual pneumatic tire.

In Fig. 2, the construction is quite similar to Fig. 1 except that the wheel spokes here are done away with altogether, the various parts of the wheel hub of Fig. 1 being sufficiently enlarged to allow of the elimination of the spokes. The construction of Fig. 2 is especially adapted for heavy truck wheels using solid rubber tires. In this construction, all the parts are made stronger and heavier for the more exacting service to be rendered. Instead of using ball bearings between the inner and outer disks, the disks are here in substantial engagement, lubricant taking the place of the ball bearings of the earlier described construction. A felt washer 44 is secured to the outer disk 17ª to prevent the introduction of dust within the wheel and also prevent lubricant from between the disks working its way out of the wheel. The steel casing 19ª here has a somewhat different shape, the ring 22 holding the flanges thereof apart as before. A tread of solid rubber which may be in two or more parts, as indicated at 47, is mounted upon the wheel and held in place by the two outer disks 17, 17ª and by the rim 46 also held between said disks. The bolts 18 here pass through wooden ring supports 45 on each side of the wheel, which supports are chiefly for the purpose of providing a base or track for the peripheries of the disks 31 to ride on in case the cushioning member should become deflated. Otherwise, the construction is the same as has been previously described.

In the modification of Fig. 3, the wheel of Fig. 2 has been changed to provide for a narrower wheel rim with a smaller solid rubber tread. Here the outer disks 17, 17ª have inturned flanges 48 of function similar to the ring supports 45, which flanges are in turn bent to provide parallel tread-holding sides 49 each having interior shoulders at 50 for receiving and seating the rim 46. The steel casing 19ᵇ here takes a third form, having its flanges held to the outer disks by the bolts 18 as in the construction of Fig. 1.

Instead of a penumatic cushion being used in the three resilient wheels which have been described, it is entirely feasible to substitute a solid rubber cushion where the wheels are to be used on slow moving vehicles or the like.

One of the important features of this invention, which is common to all the forms, is that the inner tube projects farther towards the center of the wheel than the beads of the mantle or tire casing, or in other words, the securing means 26 is located at the place where the beads of the mantle contact with the inner disks. By this means the proper ratio between the air volume of the inner tube and the bearing surface of the same is maintained.

Another feature of importance distinguishing this invention from other resilient wheels is the construction of a hub having an inner and an outer pair of radially overlapping disks, disposed in rectangular position with relation to the wheel axle, and normally concentric, but independent of each other, so as to allow radial and tangential play of one pair relative to the other pair.

It will be understood that the parts 17, 17ª, 31, 19, 22 and 11 constitute a housing for the cushion, and whenever referred to in the claims, it is my intention that such interpretation shall be given to said housing.

What is claimed is:—

1. A resilient wheel including an axle supported sleeve, a pair of inner disks mounted on said sleeve, a pair of outer disks secured together and movable relatively to the inner disks, a casing secured to the outer disks and having an inwardly projecting convex part throughout its entire circumference, a resilient cushion mounted on said sleeve between the inner disks and including a mantle bearing against the convex part of said casing, the entire resilient action of the wheel being derived from the resilient cushion upon the sleeve.

2. A resilient wheel including an axle-supported housing, and resilient means including a resilient cushion and a mantle for protecting the outer portions thereof, said housing including a ring having a portion inwardly convex throughout its entire circumference, the crown of said inwardly convex portion bearing against the resilient cushion covered by the mantle when a load is put upon the wheel, the edges of the mantle being clinched to the sides of the housing substantially midway between the axle and the outer periphery of the housing and providing a three-point contact between the mantle and the housing.

3. A resilient wheel including a housing and a resilient cushion with a mantle, said cushion and mantle being convex transversely on its peripheral portion, the housing including a ring having an inwardly-projecting portion engaging the convex portion of the cushion and mantle, said mantle being secured at opposite points on the opposite faces of the inner sides of the housing, the crown of the cushion and mantle sustaining a thrust from the crown of the inwardly-projecting portion when a load is put upon the wheel.

4. A resilient wheel including an axle supported sleeve, a pair of disks secured upon said sleeve, means to form with said disks a protective housing, a pneumatic cushion mounted on the sleeve within the housing, said pneumatic cushion including an inner tube and a mantle therefor, the mantle covered portion of the inner tube being out of engagement with the disks and the sleeve, and means at the ends of the sleeve for contacting with the inner disks and having concaved faces for protecting the pneumatic cushion at the corners.

5. A resilient wheel comprising an annular cushion, an axle supported sleeve mounting said cushion, a pair of inner disks secured upon said sleeve and protecting the sides of the cushion, a pair of outer disks partly enclosing the inner disks and movable relatively to the same, one of the outer disks having an opening, a driving member secured in the opening, and a washer fitting within the driving member and abutting the outer face of the inner disk to prevent foreign matter from entering the interior of the wheel.

6. A resilient wheel comprising an annular cushion, an axle-supported sleeve mounting said cushion, a pair of inner disks secured upon said sleeve and protecting the sides of the cushion, a pair of outer disks partly enclosing the inner disks but spaced therefrom and protecting the peripheral portion of the cushion, anti-friction means located at the peripheral outer edges of the inner disks and adapted to engage the inner faces of the inner and outer disks, and rings located upon the peripheries of the inner disks and bearing against the outer disks to hold the anti-friction means in place.

7. A resilient wheel comprising a housing and a cushion within the housing, said housing including a portion mounted on the axle, the cushion being seated within this portion, and a portion partly enclosing the first-named portion and supported upon said cushion, said cushion comprising an inner member and an outer member having a periphery convex transversely, the outer portion of the housing having a peripheral portion convex transversely and normally bearing on the periphery of the outer member of the cushion, the outer member of the cushion which bears against the convex outer portion of the housing being secured to the housing and supported independently of the inner member of the cushion.

8. A resilient wheel comprising a housing and a cushion within the housing, said housing including a portion mounted on the axle, the cushion being seated within this portion, and a portion partly enclosing the first-named portion and supported upon said cushion, said cushion comprising a flexible inflatable tube having a rectangular and a convex portion in cross section, and a protective mantle of relatively heavy material connected at its peripheral edges to the inner opposite faces of the housing where the convex portion of the inner tube joins the rectangular portion of said tube.

9. A resilient wheel including a housing and a pneumatic cushion mounted within the housing, said housing including a pair of spaced disks coaxially mounted, a clinching member held against rotation on the inner face of said disks, means secured to each disk outside of the clinching member to prevent radial movement of said member, said clinching member holding the pneumatic cushion in position.

10. A resilient wheel including a housing and a pneumatic cushion mounted within the housing, said housing including a pair of spaced disks coaxially mounted, said pneumatic cushion comprising an inflatable tube and a mantle of relatively heavy material mounted upon the peripheral portion of said tube, a clinching member held against rotation on the inner face of each disk, a ring secured to the disk outside of the clinching member to prevent radial movement of said member, said clinching member engaging with said mantle to hold the pneumatic cushion in position.

11. In a resilient wheel, a sleeve, a pair of inner disks mounted thereon, a pair of outer disks mounted in concentric relation with the inner disks and movable on the same, a casing connected to the outer periphery of the outer disks and closing the space between said disks and having an inwardly projecting convex portion transversely of the wheel, an inner tube arranged in the space between the inner disks and the sleeve and bearing upon the outer face of the latter, a mantle fitted upon the outer peripheral face of the inner tube between the disks and imparting to said face a convex shape in cross section, the convex face of the mantle bearing against the convex portion of the said casing, and clinching means engaging the beads of the mantle where they contact with the inner disks, the inner tube projecting farther toward the center of the wheel than the beads of said mantle.

12. A resilient wheel including an axle-supported sleeve, a pair of inner disks mounted on said sleeve, a pair of outer disks mounted in concentric relation with the inner disks, a casing secured to and between the outer disks, a resilient cushion comprising a mantle having its peripheral side edges clinched at the sides of the inner disks, and an inner tube mounted on the sleeve and embraced between the mantle and the sleeve in one direction and laterally between the inner disks in the other direction and in engagement with said sleeve, disks and mantle, whereby said inner tube extends farther inwardly towards the center of the wheel than the peripheral side edges of the mantle to give the proper ratio between the air volume and the bearing surface of the resilient cushion, the mantle and the casing being provided with crown portions in engagement with each other.

13. A resilient wheel including an axle-supported housing, and a resilient cushion comprising a mantle and an inner tube, said mantle protecting the outer periphery of the inner tube, said housing including a ring having a portion inwardly convex throughout its entire circumference, the crown of said inwardly-convex portion bearing against the resilient cushion covered by the mantle when a load is put upon the wheel, the side edges of the mantle being clinched at the sides of the housing substantially midway between the axle and the outer periphery, whereby said inner tube extends further inwardly towards the center of the wheel than the side edges of the mantle to give the proper ratio between the air volume and the bearing surface of the resilient cushion on the inwardly-convex portion of the housing.

14. A resilient wheel comprising an axle-supported sleeve, a pair of inner disks mounted on said sleeve, a pair of outer disks mounted in concentric relation with the inner disks and movable relatively to the same, a casing secured to and between the outer disks, a resilient cushion mounted on the sleeve between the inner disks and engaging with the casing, an annular cushion fitted within the outer disks at each side and bearing against said casing and spaced from the outer periphery of the inner disks, and a ring mounted upon the periphery of each of the inner disks and bearing against the inner side of each of the outer disks.

In testimony, that I claim the foregoing as my own, I have hereto affixed my signature.

PAUL DE PFYFFER.